United States Patent
Maji et al.

(10) Patent No.: US 9,530,323 B1
(45) Date of Patent: Dec. 27, 2016

(54) AIRCRAFT SYSTEMS AND METHODS TO MONITOR PROXIMATE TRAFFIC

(71) Applicant: HONEYWELL INTERNATIONAL INC., Morristown, NJ (US)

(72) Inventors: Sanjib Kumar Maji, Karnataka (IN); Satyanarayan Kar, Karnataka (IN); Sandeep Chakraborty, West Bengal (IN); Jitender Kumar Agarwal, UttarPradesh (IN)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 0 days.

(21) Appl. No.: 14/800,179

(22) Filed: Jul. 15, 2015

(51) Int. Cl.
*G08G 5/00* (2006.01)
*G01S 13/06* (2006.01)

(52) U.S. Cl.
CPC ............ *G08G 5/0078* (2013.01); *G01S 13/06* (2013.01); *G08G 5/0008* (2013.01); *G08G 5/0021* (2013.01)

(58) Field of Classification Search
CPC .. G08G 5/0078; G08G 5/0008; G08G 5/0021; G01S 13/06
See application file for complete search history.

(56) References Cited

U.S. PATENT DOCUMENTS

| | | | | |
|---|---|---|---|---|
| 5,418,537 A | | 5/1995 | Bird | |
| 6,469,660 B1 * | | 10/2002 | Horvath | G01S 7/06 340/961 |
| 6,473,003 B2 * | | 10/2002 | Horvath | G01S 1/047 340/945 |
| 7,961,136 B2 | | 6/2011 | Stefani et al. | |
| 8,666,650 B2 | | 3/2014 | Mutuel et al. | |
| 2006/0265109 A1 * | | 11/2006 | Canu-Chiesa | B64D 43/00 701/3 |
| 2011/0246001 A1 | | 10/2011 | Shavit | |
| 2013/0009792 A1 * | | 1/2013 | Shafaat | G08G 5/0008 340/979 |
| 2013/0191015 A1 * | | 7/2013 | Kar | G08G 5/0021 701/120 |
| 2014/0375504 A1 | | 12/2014 | Meunier | |

OTHER PUBLICATIONS

Corner, A.; MH370-ICAO's proposals for aircraft tracking and surveilance; Sep. 22, 2014.
Presented by Laurent Vidal—Surveillance systems manager—Support to sales & programs; AIRBUS; ADS-B in (ATSAW) presentation—ADS-B task force—Jeju Apr. 2012.

* cited by examiner

*Primary Examiner* — Michael J Zanelli
(74) *Attorney, Agent, or Firm* — Lorenz & Kopf, LLP (57) ABSTRACT

An aircraft system for an own-ship aircraft includes an ADS-B unit configured to receive ADS-B messages with flight information from other aircraft over a plurality of time periods, the other aircraft including a first aircraft. The system further includes a database configured to store at least a portion of the flight information associated with the other aircraft over the plurality of time periods. The system further includes a processing unit configured to compare the flight information for a current time period to the flight information for a previous time period to identify missing flight information from the current time period relative to the previous time period, the missing flight information including the flight information associated with the first aircraft, and initiate an annunciation to an operator of the own-ship aircraft based on the missing flight information associated with the first aircraft.

17 Claims, 5 Drawing Sheets

AIRCRAFT SYSTEMS AND METHODS TO MONITOR PROXIMATE TRAFFIC

TECHNICAL FIELD

The present invention generally relates to aircraft systems and methods, and more particularly, to systems and methods for monitoring traffic in an area around the aircraft during flight.

BACKGROUND

Computer generated aircraft displays have become highly sophisticated and are used to provide flight crews with real-time visual representations of flight management, navigation, and control information. As a result, such displays have become effective visual tools for controlling aircraft, reducing pilot workload, increasing situational awareness, and improving overall flight safety.

As one example, a traffic display presents the operator with the relative positions of other aircraft in the vicinity of the aircraft during flight. The positions of the traffic relative to the aircraft may be determined based on Automatic Dependent Surveillance-Broadcast (ADS-B) messages received by the aircraft. Generally, ADS-B messages are broadcast by aircraft to other aircraft and air traffic control to enable the recipient of the message to determine the position of the broadcasting aircraft. As a result of this arrangement, the traffic display may be dependent on continuously receiving accurate ADS-B messages from other aircraft. However, for various reasons, such ADS-B messages may not be received, thereby potentially impacting the accuracy of the traffic display.

Accordingly, it is desirable to provide systems and methods that provide improved traffic monitoring and display during flight. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, an aircraft system for an own-ship aircraft includes an Automatic Dependent Surveillance-Broadcast (ADS-B) unit configured to receive ADS-B messages with flight information from other aircraft over a plurality of time periods, the other aircraft including a first aircraft. The system further includes a database coupled to the ADS-B unit and configured to store at least a portion of the flight information associated with the other aircraft over the plurality of time periods. The system further includes a processing unit coupled to the ADS-B unit and the database and configured to compare the flight information for a current time period to the flight information for a previous time period to identify missing flight information from the current time period relative to the previous time period, the missing flight information including the flight information associated with the first aircraft, and initiate an annunciation to an operator of the own-ship aircraft based on the missing flight information associated with the first aircraft.

In accordance with another exemplary embodiment, a method is provided for monitoring aircraft traffic on an own-ship aircraft. The method includes receiving first messages with flight information from other aircraft during a first time period; evaluating the flight information to identify proximate aircraft from the other aircraft relative to the own-ship aircraft; displaying symbology representing at least the proximate aircraft on a traffic display of a display device; storing the flight information for each of the proximate aircraft; receiving second messages with flight information from at least a portion of the other aircraft during a second time period; comparing the flight information from the second messages with the flight information from the first messages to identify missing flight information in the second time period, the missing flight information being associated with at least a first aircraft of the other aircraft; and generating an annunciation based on the missing flight information for the first aircraft.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Broadly, exemplary embodiments described herein provide aircraft systems and methods that monitor and display traffic information. More specifically, the systems and methods correlate currently received Automatic Dependent Surveillance-Broadcast (ADS-B) messages with previously received ADS-B messages to identify aircraft for which an ADS-B message has not been recently received, thereby indicating a possible problem with the ADS-B system of the other aircraft. Depending on a number of factors, such aircraft may be identified as missing traffic. In various embodiments, the systems and methods may send a message to air traffic control regarding the missing traffic, present information about the missing traffic to the operator, and/or evaluate the missing traffic for display or warnings.

Figure 1:
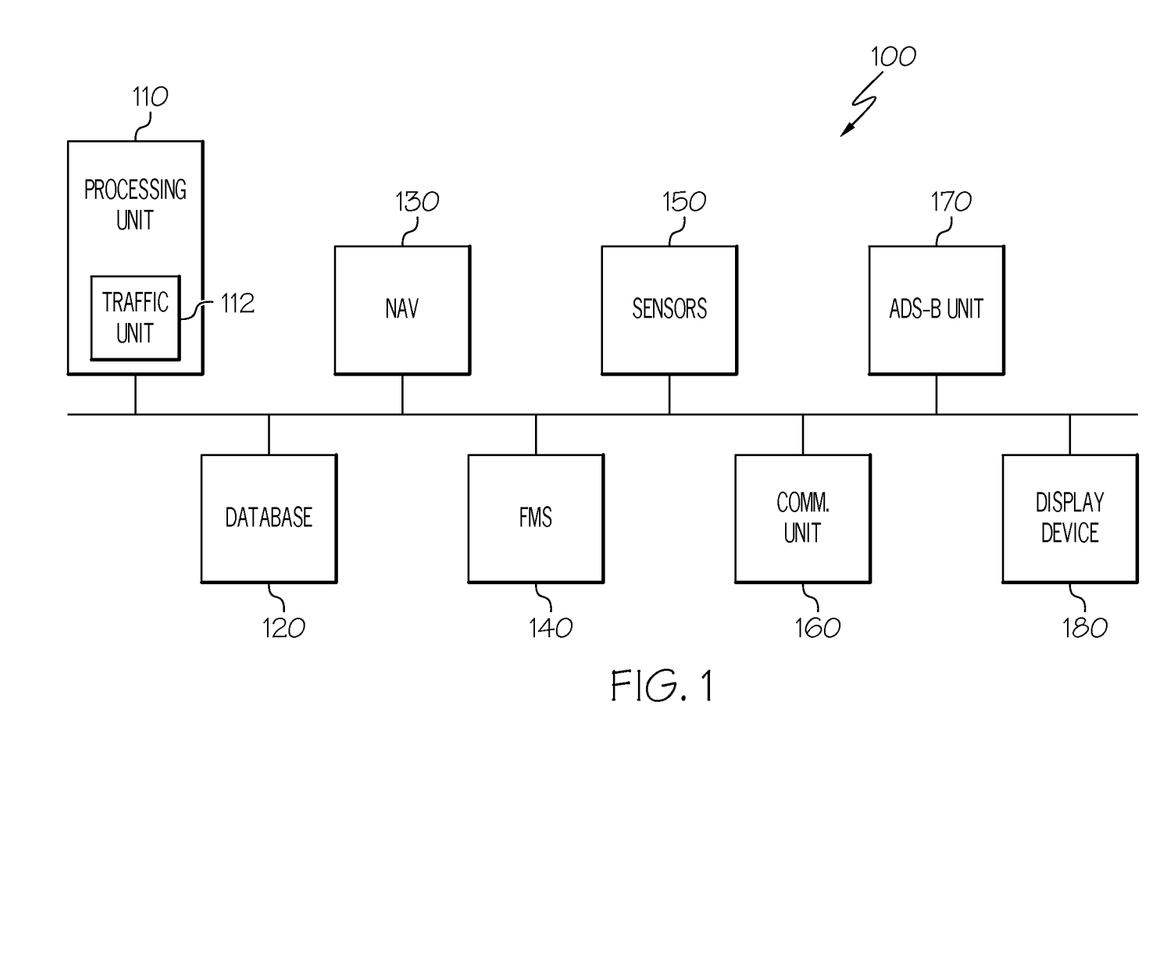
FIG. 1 is a functional block diagram of an aircraft system to monitor aircraft traffic in accordance with an exemplary embodiment.

FIG. 1 is a block diagram of an aircraft system 100 in accordance with an exemplary embodiment. It should be understood that FIG. 1 is a simplified representation of the system 100 for purposes of explanation and ease of description. Further exemplary embodiments of the system 100 may include additional or other devices and components for providing further functions and features. The system 100 can be utilized in an aircraft, such as a helicopter, airplane, or unmanned vehicle. Moreover, exemplary embodiments of the system 100 can also be utilized in spacecraft, ships, submarines, and other types of vehicles. For simplicity, exemplary implementations are described below with reference to "aircraft."

As described below, the system 100 is particularly useful during flight to monitor other aircraft (e.g., "traffic") in the vicinity of the aircraft. In one exemplary embodiment, the system 100 is typically housed and implemented on the own-ship aircraft to enable an operator to monitor other aircraft within a broadcast range, although one or more components may also be located external to the aircraft. Generally, unless otherwise noted, the term "aircraft" refers to the own-ship aircraft associated with the aircraft system 100

As shown in FIG. 1, the system 100 includes a processing unit 110, a database 120, a navigation system 130, a flight management system 140, sensors 150, a communication unit 160, an ADS-B unit 170, and a display device 180 coupled together in any suitable manner, such with as a data bus. Although the system 100 appears in FIG. 1 to be arranged as an integrated system, the system 100 is not so limited and can also include an arrangement whereby one or more aspects of the system 100 are separate components or subcomponents of another system located either onboard or external to the aircraft. Additional details about the function and operation are provided below after a brief introduction of the components of the system 100.

The processing unit 110 may be a computer processor associated the various aircraft functions discussed below. In one exemplary embodiment, the processing unit 110 functions to at least receive and/or retrieve aircraft flight management information (e.g., from the flight management system 140), navigation and control information (e.g., from the navigation system 130), and target, terrain, and/or traffic information (e.g., from the database 120, sensors 150, communication unit 160, and/or ADS-B unit 170). As introduced above and discussed in further detail below, the processing unit 110 includes a traffic unit 112 that monitors and evaluates traffic information, and as appropriate, initiates messages to air traffic control (ATC), and presents information associated with the traffic to the operator, e.g., in the form of a visual traffic display. Accordingly, the processing unit 110 may function as a graphics display generator to generate display commands based on algorithms or other machine instructions stored in the processing unit 110, database 120, or other memory components. The processing unit 110 then sends the generated display commands to display device 180 for presentation to the user.

Depending on the embodiment, the processing unit 110 may be implemented or realized with a general purpose processor, a content addressable memory, a digital signal processor, an application specific integrated circuit, a field programmable gate array, suitable programmable logic device, discrete gate or transistor logic, processing core, discrete hardware components, or any combination thereof. In practice, the processing unit 110 includes processing logic that may be configured to carry out the functions, techniques, and processing tasks or methods associated with operation of the system 100. In one exemplary embodiment, the processing unit 110 is implemented with on-board logic to provide the functions described below in real-time to the aircraft operator. In other embodiments, one or more aspects may be located remotely and/or evaluated at a later time.

Although not shown, the processing unit 110 may include a user interface coupled to the processing unit 110 to allow a user to interact with the display device 180 and/or other elements of the system 100. The user interface may be realized as a keypad, touchpad, keyboard, mouse, touch panel, joystick, knob, line select key or another suitable device adapted to receive input from a user. In some embodiments, the user interface may be incorporated into the display device 180, such as a touchscreen. In further embodiments, the user interface is realized as audio input and output devices, such as a speaker, microphone, audio transducer, audio sensor, or the like.

Database 120 is coupled to processing unit 110 and can be a memory device (e.g., non-volatile memory, disk, drive, tape, optical storage device, mass storage device, etc.) that stores digital landing, waypoint, target location, and terrain data as either absolute coordinate data or as a function of aircraft position that enables the construction of a synthetic or enhanced representation of the aircraft operating environment. Database 120 can additionally include other types of navigation and/or operational information relating to the evaluation and display of information. Data in the database 120 may be uploaded prior to flight or received from external sources, such as an airport and other aircraft transmissions and/or onboard sensors. As described below, the database 120 may be used to store aircraft traffic information received from various sources.

The navigation system 130 is configured to provide the processing unit 110 with real-time navigational data and/or information regarding operation of the aircraft. The navigation system 130 may include or cooperate with a global positioning system (GPS), inertial reference system (IRS), Air-data Heading Reference System (AHRS), or a radio-based navigation system (e.g., VHF omni-directional radio range (VOR) or long range aid to navigation (LORAN)). The navigation system 130 is capable of obtaining and/or determining the current state of the aircraft, including the location (e.g., latitude and longitude), altitude or above ground level, airspeed, pitch, glide scope, heading, and other relevant flight information.

The flight management system 140 supports navigation, flight planning, and other aircraft control functions, as well as provides real-time data and/or information regarding the operational status of the aircraft. The flight management system 140 may include or otherwise access one or more of the following: a weather system, an air traffic management system, a radar system, a traffic avoidance system, an autopilot system, an auto-thrust system, a flight control system, hydraulics systems, pneumatics systems, environmental systems, electrical systems, engine systems, trim systems, lighting systems, crew alerting systems, electronic checklist systems, an electronic flight bag, and/or other suitable avionics systems. As examples, the flight management system 140 may identify operating states of the aircraft, such as engine operation and current aircraft configuration status, including information regarding the current flap configuration, aircraft speed, aircraft pitch, aircraft yaw, aircraft roll, and the like. Additionally, the flight management system 140 may identify or otherwise determine environmental conditions at or near the current location of the aircraft, such as, for example, the current temperature, wind speed, wind direction, atmospheric pressure, and turbulence. The flight management system 140 may also identify optimized speeds, distance remaining, time remaining, cross track deviation, navigational performance parameters, and other travel parameters.

The system 100 may include or otherwise receive information from one or more sensors 150. In one exemplary embodiment, the sensors 150 may include light sensing devices, such as a visible low light television camera, an infrared camera, and millimeter wave (MMW) camera. Other sensors 150 may include, as examples, radar, lidar, sonar, and/or weather sensors that may provide information to the system 100. In some embodiments, the sensors 150 may be incorporated into the navigation system 130, flight management system 140, or enhanced vision systems. As described below, the sensors 150 may particularly function to collect information about the position, nature, and arrangement of aircraft traffic during flight.

The communication unit 160 may be any suitable device for sending and receiving information to and from the system 100. In some embodiments, communication unit 160 may be configured to receive radio frequency transmissions, satellite communication transmissions, optical transmissions, laser light transmissions, sonic transmissions or transmissions of any other wireless form of data link. In one exemplary embodiment, the communication unit 160 is configured to send and/or receive information with air traffic control. As described below, the communication unit 160 may exchange automated or selected messages with air traffic control about traffic, either as text-based messages, voice communications, or other forms. The communication unit 160 may interpret received communications and present this information to the processing unit 110.

As previously noted, the ADS-B unit 170 is coupled to the processing unit 110. Generally, ADS-B unit 170 functions as part of a cooperative surveillance mechanism for air traffic management and related applications. In one exemplary embodiment, the ADS-B unit 170 includes a transponder that automatically and periodically transmits messages that include state vector data (e.g., flight information) for the broadcasting aircraft. Such aircraft state vectors may include, as examples, aircraft position, airspeed, altitude, intent (e.g., whether the aircraft is turning, climbing, or descending), aircraft type, and flight number. The aircraft state vectors may be provided to the ADS-B unit 170 for transmission as ADS-B messages by the processing unit 110 or other systems. The ADS-B unit 170 similarly receives ADS-B messages with state vectors from other aircraft in a broadcast area and provides the received ADS-B messages to the processing unit 110 for evaluation and, as appropriate, additional action, as discussed below. In some embodiments, the ADS-B messages sent by the ADS-B unit 170 may be referenced as "ADS-B OUT" and the ADS-B messages received by the ADS-B unit 170 may be referenced as "ADS-B IN."

The system 100 also includes the display device 180 coupled to the processing unit 110. The display device 180 may include any device or apparatus suitable for displaying various types of computer generated symbols and flight information discussed above. Using data retrieved (or received) from the navigation system 130, flight management system 140, database 120, sensors 150, communication unit 160, and/or ADS-B unit 170, the processing unit 110 executes one or more algorithms (e.g., implemented in software) for determining the position of the various types of desired information on the display device 180. As noted above, the processing unit 110 then generates display commands representing this data, and sends display commands to the display device 180. Any suitable type of display medium capable of visually presenting multi-colored or monochrome flight information for a pilot or other flight crew member can be provided, such as, for example, various types of CRT displays, LCDs, OLED displays, plasma displays, projection displays, HDDs, HUDs, and the like. Additional details regarding the information displayed on the display device 180 are provided below.

As described below, the system 100 is particularly suitable for monitoring, evaluating, and presenting air traffic information to the operator during flight. During operation, the traffic unit 112 of the processing unit 110 may determine or otherwise receive the current position and energy parameters (e.g., altitude, track, etc.) of the aircraft (e.g., via the navigation system 130 or flight management system 140). The traffic unit 112 may also receive ADS-B messages from other aircraft (e.g., via the ADS-B unit 170). The traffic unit 112 is configured (i.e., processing unit 110 is loaded with, and operates, appropriate software, algorithms and/or sub-routines) to evaluate the position and energy parameters of the other aircraft relative to the own-ship aircraft and to generate display commands for the display device 180 to render appropriate traffic information. In most situations, the system 100 graphically displays the traffic information on the display device 180 to provide an accurate depiction of the other aircraft within the vicinity of the own-ship aircraft based on the ADS-B messages. However, in one exemplary embodiment, the processing unit 110 is configured to monitor and evaluate aircraft from which messages are not received, and in some situations, the processing unit 110 is configured to alert the pilot and/or air traffic control about missing messages from other aircraft. The reasons for the system 100 failing to receive an ADS-B message from other aircraft may vary, including an issue with the transponder of the ADS-B unit of the other aircraft (e.g., a malfunction or intentional or accidental ADS-B deactivation). Regardless of the reason, the system 100 functions to identify those aircraft while anticipating or addressing possible resulting issues. In conventional systems, such traffic may simply disappear from a traffic display without notice by the operator. Additional details regarding the operation and resulting display of the system 100 are provided below.

Figure 2:
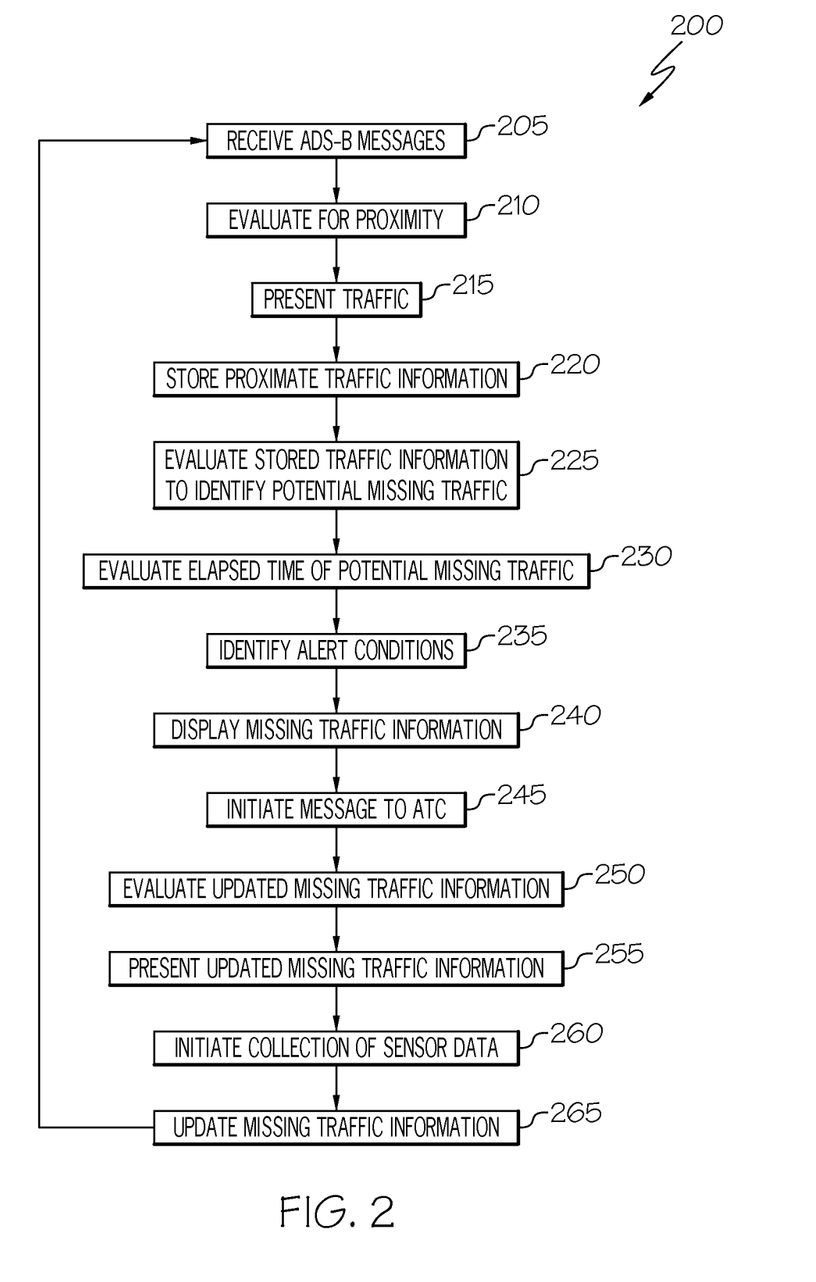
FIG. 2 is a flowchart of a method for monitoring aircraft traffic in accordance with an exemplary embodiment.

FIG. 2 is a flowchart of an exemplary method 200 to monitor, evaluate, and display traffic information to an aircraft operator on an aircraft display device. In one exemplary embodiment, the method 200 may be implemented by the system 100 of FIG. 1. As such, FIGS. 1 and 2 are referenced in the discussion below. It should be appreciated that method 200 may include any number of additional or alternative tasks, and the tasks shown in FIG. 2 need not be performed in the illustrated order. Generally, the method 200 is implemented or executed in an iterative manner within a current time period (or at a current point in time) with consideration for previous time periods (or previous points in time). In one exemplary embodiment, the time period may generally correspond to the frequency of receiving ADS-B messages, e.g., every second, although other time periods may be considered or implemented. In one exemplary embodiment, the method 200 may be selectively implemented under certain conditions. As an example, the method 200 may be active at particular altitudes, locations, or flight phases and inactive during other situations.

In a first step 205, the aircraft system 100 receives ADS-B messages from other aircraft within a broadcast area. As noted above, these messages may include the aircraft flight identification (ID), position, altitude, and track. In one exemplary embodiment, the messages may be received by the ADS-B unit 170 and provided to the traffic unit 112. The aircraft system 100 may further receive traffic information from additional or other sources, including a traffic collision avoidance system (TCAS), a traffic information service broadcast (TIS-B) and/or an automatic dependent surveillance rebroadcast (ADS-R), which may be received and/or processed with the communication unit 160, flight management system 140, and/or the processing unit 110. This information may also be provided to the traffic unit 112.

In a second step 210, the traffic unit 112 or other component of the aircraft system 100 evaluates the flight information in each of the messages to determine the proximity of the other aircraft. In particular, the traffic unit 112 may evaluate the position, altitude, and track of the other aircraft relative to the position, altitude, and track of the own-ship aircraft. Based on this information, the traffic unit 112 identifies the other aircraft that are proximate to the own-ship aircraft. Such proximity range may be considered with respect to a predetermined range (e.g., flight time or distance) from a present (or future) position of the aircraft. The predetermined range may be selected by operator and/or set by regulation, policy, or other source. The aircraft within the predetermined proximity may be considered proximate aircraft or proximate traffic, while the aircraft outside of the predetermined proximity range may be considered non-proximate aircraft or non-proximate traffic.

Figure 3:
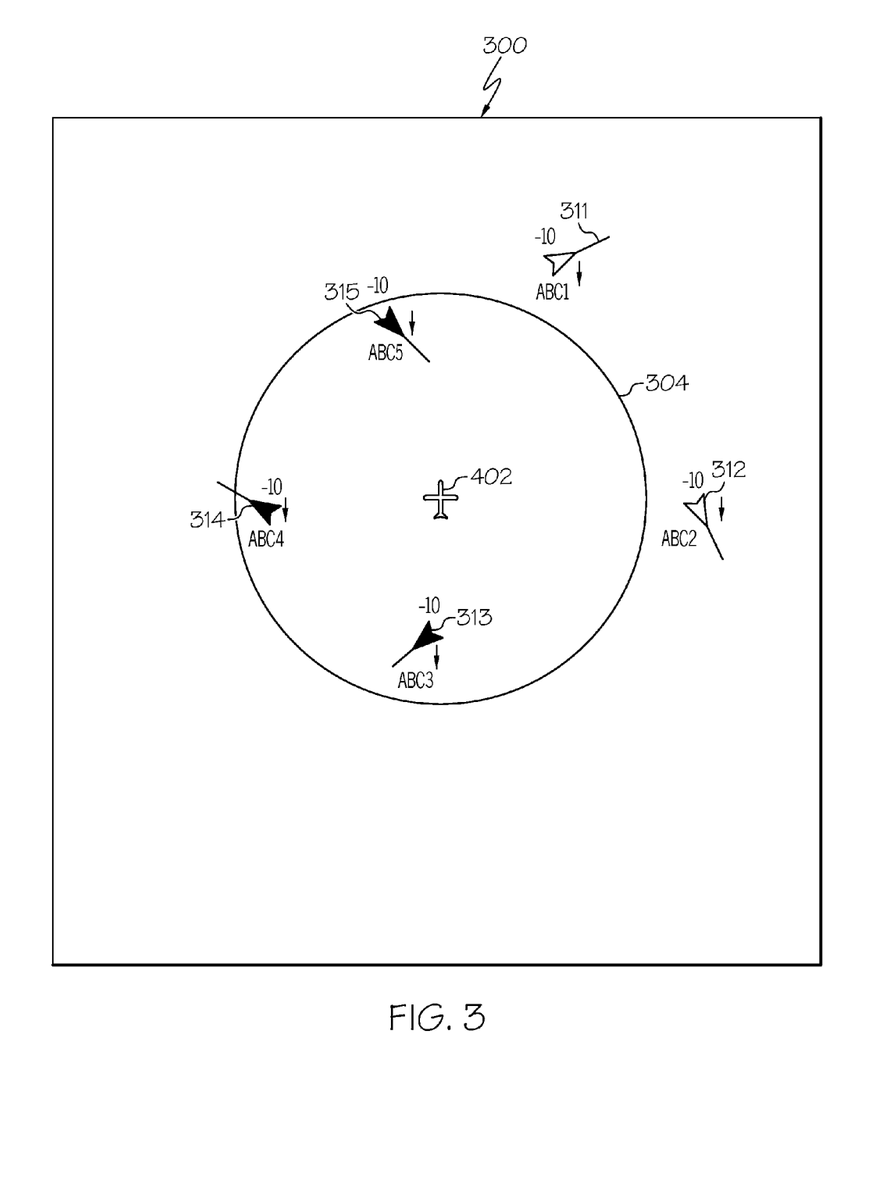
FIG. 3 is a traffic display rendered by the aircraft system of FIG. 1 in a first scenario in accordance with an exemplary embodiment.

In step 215, the traffic information is presented to the operator. The traffic information may include information regarding proximate and non-proximate traffic, as well as applicable alerts. The traffic information may be presented to the operator in the form of a traffic display. Reference is briefly made to FIG. 3, which is a traffic display 300 that may be presented on the display device 180.

In FIG. 3, the traffic display 300 is centered on the own-ship aircraft, represented by symbol or icon 302. One or more range rings 304 may be depicted to provide a distance or timing context. As shown, the traffic display 300 also includes symbology (e.g., in the form of a chevron or diamond icon) representing each aircraft that forms the traffic 311-315. In some embodiments, the traffic 311-315 corresponds to all instances of aircraft from which flight information was received. The traffic 311-315 on the traffic display 300 provides an indication to the operator of the respective positions of the other aircraft relative to the own-ship aircraft 302 in real-time. In addition to position, the symbology representing the traffic 311-315 may include various types of information. In particular, the traffic 311-315 may include an aircraft ID, the relative altitude, and the change in relative altitude. For example, aircraft 311, which has an aircraft ID of "ABC1," is positioned approximately 1000 feet below the own-ship aircraft (as indicated by the "–10") and is moving vertically down (as indicated by the down arrow). Typically, the operator continuously monitors the traffic display 300 to maintain awareness about traffic 311-315.

The symbology representing each aircraft of the traffic 311-315 also identifies the respective aircraft as proximate traffic or non-proximate traffic. In the depicted embodiment, traffic 311, 312 is non-proximate traffic, as represented by the hollow or empty icons, and traffic 313-315 is proximate traffic, as represented by the filled or solid icons. Other symbology indicating the proximity of the traffic 311-315 may be provided.

Although only five instances of traffic 311-315 are depicted in FIG. 3, the traffic display 300 may include many more instances of traffic, depending on the flight environment. As described below, the method 200 enables the identification of "missing" proximate traffic that may otherwise be overlooked if disappearing from numerous other instances of proximate traffic.

As described above, the position and appearance of the images and other symbology on the traffic display 300 may be dynamically generated by the traffic unit 112 of the processing unit 110 based on input from the database 120, navigation system 130, flight management system 140, sensors 150, communication unit 160, and/or ADS-B unit 170. In one exemplary embodiment, the traffic display 300 is overlaid on a black background. In further embodiments, the traffic display 300 is overlaid on terrain symbology in the form of a moving map display. Additionally, although the traffic display 300 is depicted as a two-dimensional plan view, the traffic display 300 may also be represented as a three-dimensional and/or elevation view, as well as from perspectives other than the own-ship aircraft. Although not shown in FIG. 3, the traffic display 300 may present alerts to the operator, including the resolution alerts and traffic alerts.

Returning to FIG. 2, in step 220, the traffic unit 112 or other component of the aircraft system 100 stores the traffic information associated with proximate traffic from the messages of step 210. The information may be stored, for example, in the database 120. The stored proximate traffic information may include a record or entry that includes, for example, the aircraft ID, position, altitude, track, and time stamp to indicate the time at which the message was received.

In steps 225 and 230, the traffic unit 112 or other component of the aircraft system 100 evaluates the stored proximate traffic information for the current time period relative to previous time periods. In particular, the traffic unit 112 correlates received proximate traffic information to stored proximate traffic information in order to identify aircraft that may be "missing." In other words, the traffic unit 112 identifies aircraft for which proximate traffic information is expected to be received but was not received, as described below.

In step 225, the traffic unit 112 evaluates the traffic records associated with proximate traffic for the current time period relative to previous time periods. In particular, the traffic unit 112 identifies traffic records for proximate traffic that have been previously received and that were not received in the present time period. Such identification may be implemented by correlating the current proximate traffic information to previously stored proximate traffic information based on, for example, aircraft identification. The aircraft with records that were previously received but did not have ADS-B messages received in the current time period may be referred to below as "potential missing traffic." As described below, the records associated with potential missing traffic are subsequently evaluated to identify if the potential missing traffic may be temporary ignored for the current time period, identified as missing proximate traffic, and/or prompt an alert.

Upon identification of the potential missing traffic, in step 230, the traffic unit 112 evaluates the temporal nature of the records of the potential missing traffic. In particular, for each aircraft of the potential missing traffic, the traffic unit 112 determines the elapsed time since the last ADS-B message received, e.g., based on the time stamp in the most recently stored record relative to the current time period. If the elapsed time is less than a predetermined amount of time, the aircraft of the potential missing traffic may be ignored for the current time period. As described below, the records of these aircraft may be subsequently evaluated in further iterations of the method 200 such that the status of the aircraft may change as time elapses. However, in the current iteration, if the elapsed time is greater than the predetermined amount of time, the potential missing traffic is identified as missing proximate traffic. In effect, step 230, during consecutive iterations of the method 200, results in a timer beginning upon identification of potential missing traffic, and upon the elapsed time reaching a predetermined threshold, the traffic unit 112 identifies the potential missing traffic as missing proximate traffic. In one exemplary embodiment, the threshold may be 20 seconds, although other time periods may be used.

In step 235, the traffic unit 112 may evaluate the missing proximate traffic to identify alert conditions. In particular, the estimated current location may be evaluated with respect to the own-ship position, altitude, and track to identify potential incidents. In one exemplary embodiment, the alert may be based on the possibility of a conflicting path of the own-ship aircraft with the missing proximate traffic based on the estimated current location and other flight parameters of the missing traffic. As such, depending on the evaluation, the missing proximate traffic may be characterized as missing proximate traffic that does not require an alert or missing proximate traffic that does require an alert. Collectively, these characterizations may be referred to as missing proximate traffic information. The alert may take any suitable form, as discussed in greater detail below.

Figure 4:
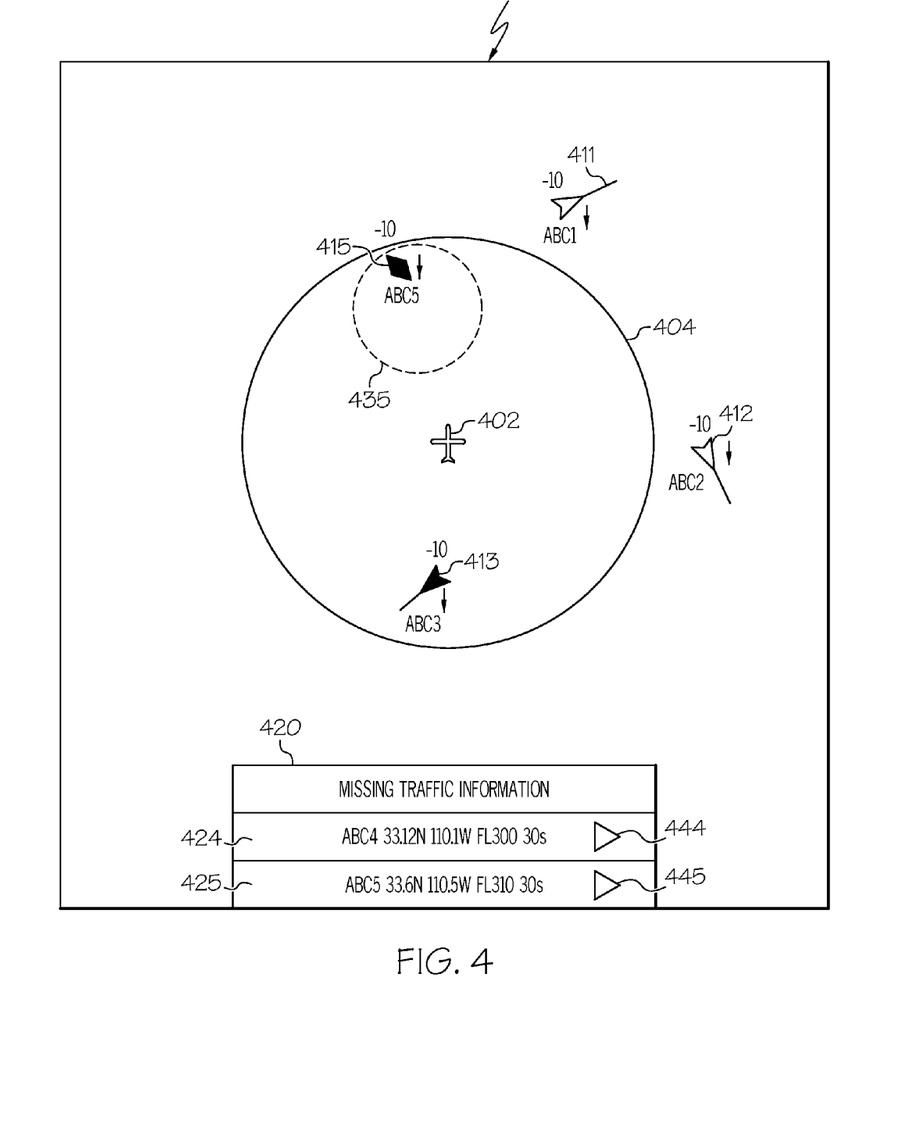
FIG. 4 is a traffic display rendered by the aircraft system of FIG. 1 in a second scenario in accordance with an exemplary embodiment.

In step 240, the traffic unit 112 or other component of the system 100 presents information (e.g., annunciations or warnings) associated with steps 230 and 235, to the operator. In one exemplary embodiment, the traffic unit 112 generates display signals to annunciate the missing traffic information, which will be described with reference to FIG. 4. Generally, FIG. 4 is a traffic display 400 similar to the traffic display 300 of FIG. 3. For example, the traffic display 400 is centered on the own-ship aircraft, represented by symbol 402, with one or more range rings 404. As shown, the traffic display 400 also includes symbology (e.g., icons) representing each aircraft that forms the surrounding traffic 411-413. The traffic 411-413 on the traffic display 400 corresponds to the aircraft traffic for which the messages were received in the current time period, e.g., similar to the traffic 311-313 of FIG. 3. In the scenario of FIG. 4, aircraft traffic 413 is proximate traffic, while aircraft traffic 411, 412 is non-proximate traffic, as indicated by the respective icon symbology, as discussed above.

The traffic display 400 may provide information regarding the missing proximate traffic in various ways. In the scenario of FIG. 4, the missing proximate traffic generally corresponds to the two aircraft associated with proximate traffic 314, 315 described above in FIG. 3. In one exemplary embodiment, the missing proximate traffic may be presented in the form of visual annunciation for each aircraft of the missing proximate traffic. In particular, the traffic display 400 may include an area 420 with a text-based message 424, 425 for each aircraft of the missing proximate traffic. Each message 424, 425 may include the aircraft identification, the last reported position, the last reported altitude, the last reported track, and/or the time elapsed since the most recent messages from the other aircraft. In the situation of FIG. 4 relative to FIG. 4, message 424 generally corresponds to the aircraft associated with proximate traffic 314 in FIG. 3, and message 425 generally corresponds to the aircraft associated with proximate traffic 315 in FIG. 3. In further embodiments, audio annunciation may be alternatively or additionally provided.

In some situations, the traffic display 400 also includes missing proximate traffic information in the form of symbology representing missing proximate traffic. In one exemplary embodiment, this symbology may be based on the alert condition from the evaluation of missing proximate traffic in step 235. In other words, additional symbology on the traffic display 400 may function as an alert for the alert condition to emphasize potential issues with the missing proximate traffic.

In the traffic display 400 of FIG. 4, the alert symbology may include an icon 415 representing the aircraft of missing proximate traffic that may conflict with the flight path of the own-ship aircraft. In the situation of FIG. 4 relative to the situation in FIG. 3, the aircraft represented by icon 415 in FIG. 4 corresponds to the same aircraft as proximate traffic 315 from FIG. 3, except that the failure to receive traffic information from this aircraft during the current time period after the predetermined timing threshold has triggered an alert condition, as discussed above in steps 225 and 230.

As shown in FIG. 4, the icon 415 for the missing proximate traffic may be positioned at the estimated position of aircraft associated with the missing proximate traffic from step 235. As previously noted, the estimated position may be based on the most recently reported position, altitude, track and time. The icon 415 for the missing proximate traffic may be presented in a manner different to the confirmed traffic 411-413, thereby indicating to the operator that the position of the missing proximate traffic icon 415 is estimated. For example, the missing proximate traffic icon 415 may have different line thicknesses, dynamic appearances (e.g., blinking), or otherwise highlighted or diminished. In the depicted exemplary embodiment, the missing proximate traffic icon 415 is depicted as a diamond shape.

Additionally, the symbology for the missing proximate traffic may include indications regarding the level of uncertainty with the estimation of the position of the missing proximate traffic icon 415. For example, a zone or range area outline 435 surrounding the icon 415 may be provided to give the operator of the own-ship additional information about the possible location of the missing proximate traffic.

The zone (e.g., outline 435) associated with the estimated position may be sized according to the level of uncertainty. For example, if no confirmed location of the missing proximate traffic has been received in a relatively brief amount of time, the zone may be smaller than if no confirmed location has been received in a relatively large amount of time. As described below, the zone may be omitted or resized if updated information about the position is received from other sources. As such, the symbology presented for the missing proximate traffic (e.g., 415, 435) on traffic display 400 improves situational awareness by providing the operator an estimate of the relative location of any aircraft that may be in the area, even though the aircraft may not be broadcasting ADS-B messages.

Returning to FIG. 2, the method 200 proceeds to step 245 in which the traffic unit 112 or other component may initiate a message to air traffic control. In particular, the message to air traffic control may include information regarding the most recent ADS-B message from the missing proximate traffic. In one exemplary embodiment, the message to air traffic control may include a request for additional information about the missing proximate traffic. In some situations, air traffic control may have additional information regarding the status of the missing proximate traffic. As such, in response, the ATC may provide additional information about the current or more recent location, altitude, and/or track of the missing proximate traffic. In one exemplary embodiment, these messages may be transmitted via the communication unit 160 and/or systems such as datalink or aircraft communications addressing and reporting systems (ACARS), CPDLC, or voice messages.

Referring to FIG. 4, in one exemplary embodiment, the traffic display 400 may include symbology to initiate a request for additional information from air traffic control. For example, the area 420 with the text-based messages 424, 425 may further include symbols 444, 445 to initiate the information request. As such, upon operator selection of the symbol 444, 445, a message is generating requesting updated information for the respective aircraft. In other embodiments, such messages may be automatically generated and sent.

Returning to FIG. 2, in step 250 updated information from air traffic control may be received and evaluated. For example, such information may include an updated position for one or more aircraft of the missing proximate traffic.

Figure 5:
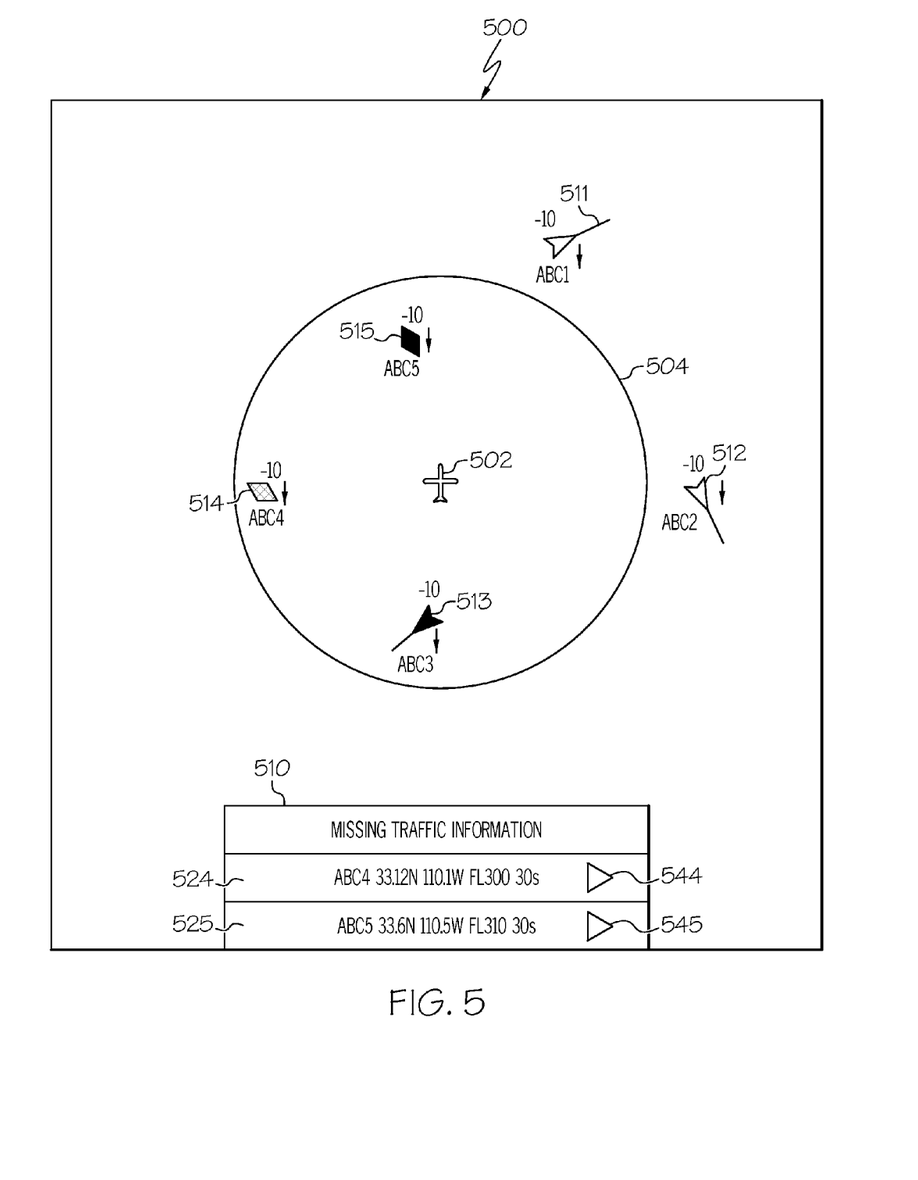
FIG. 5 is a traffic display rendered by the aircraft system of FIG. 1 in a third scenario in accordance with an exemplary embodiment.

In step 255, the updated information from air traffic control may be presented to the operator. Reference is briefly made to FIG. 5, which corresponds to a traffic display 500 that has been updated relative to the traffic display 400 in FIG. 4. As in FIG. 4, FIG. 5 depicts an own-ship aircraft 502, range ring 504, confirmed non-proximate traffic 511, 512, and confirmed proximate traffic 513. As above, the traffic 511, 512, 513 is based on messages received from the associated aircraft in the current time period.

Relative to FIG. 3, the aircraft associated with missing proximate traffic 314, 315 is still missing, e.g., based on not receiving position information from the aircraft. As such, the visual annunciation in area 520 with messages 524, 525 corresponding to each aircraft is presented with the appropriate information. Relative to FIG. 4, however, the traffic display 500 of FIG. 5 is updated to reflect the additional information received by the traffic unit 112. For example, in the situation of FIG. 5, air traffic control provided updated information associated with missing proximate traffic 514 (e.g. corresponding to proximate traffic 314 of FIG. 3) and missing proximate traffic 515 (e.g. corresponding to proximate traffic 315 of FIG. 3 and missing proximate traffic 415 of FIG. 4). The visual display 500 may present the updated missing proximate traffic 514, 515 in a manner that distinguishes it over confirmed proximate and non-proximate traffic 511-513. For example, each of the updated missing proximate traffic 514, 515 is depicted with a diamond shape.

The updated missing proximate traffic 514, 515 may also be presented in a manner that indicates the nature of the traffic. For example, the icon for traffic 514 has a hatched or partially solid interior, while the icon for traffic 515 is solid. The solid nature of traffic 515 reflects the alert condition discussed above with reference to step 235. However, relative to the traffic display 400 of FIG. 4, the zone 435 has been removed based on the updated information from the air traffic control to indicate the reduced level of uncertainty regarding the position of traffic 515. As also shown in FIG. 5, operator may request further updated information from air traffic control with symbols 544, 545 in area 520.

In step 260, the traffic unit 112 may initiate the collection of additional information about the missing proximate traffic from other components or systems of the aircraft. For example, as noted above, the navigation system 130, flight management system 140, and/or sensors 150 may include various types of sensors that are used for a number of navigation and control functions, such as primary radar or EVS sensors. For example, such sensors may collect information in the estimated area of the missing proximate traffic in order to identify updated characteristics of the aircraft without the ADS-B messages. In one exemplary embodiment, step 260 may be omitted if air traffic control provided updated information for the missing proximate traffic in step 250. In other words, in one exemplary embodiment, step 260 may be initiated upon failure to receive updated information from air traffic control. In step 265, if additional or updated information is received from other aircraft system, the traffic display may be further updated, e.g., by updating the symbology representing the missing proximate traffic, in a manner similar to that depicted in FIG. 5 or other manner to indicate the source of the updated information (e.g., from air traffic control or sensors).

Although depicted with respect to traffic displays 300, 400, 500, other display formats may be provided. For example, aspects of exemplary embodiments may be implemented in one or more of a multi-function display (MFD), a three-dimensional MFD, a primary flight display (PFD), a synthetic vision system (SVS) display, a vertical situation display (VSD), a horizontal situation indicator (HSI), a traffic awareness and avoidance system (TAAS) display, and/or a traffic alert and collision avoidance system (TCAS).

Accordingly, the exemplary embodiments discussed above provide improved monitoring, evaluation, and display of aircraft traffic. In particular, exemplary embodiments function to identify, monitor, evaluate, and display missing aircraft traffic by identifying missing ADS-B messages. As such, missing aircraft traffic information may be presented to the operator for further consideration, including displays, alerts, and/or messages to air traffic control. Further, estimates and/or updated information about the missing aircraft traffic information may be presented to the user to improve situational awareness and safety. In one exemplary embodiment, such information may be presented in the context of a familiar display, such as a traffic display, thereby providing a more convenient and/or salient presentation for easy recognition and evaluation. As such, the operator may provide the proper amount of attention to the missing aircraft traffic, thereby reducing workload and navigation and control errors, improving performance consistency, and increasing flight safety.

The steps of a method or algorithm described in connection with the embodiments disclosed herein may be embodied directly in hardware, in a software module stored in any suitable computer readable storage medium and executed by a processor, or in a combination thereof. For the sake of brevity, conventional techniques related to graphics and image processing, navigation, flight planning, aircraft controls, aircraft data communication systems, and other functional aspects of certain systems and subsystems (and the individual operating components thereof) may not be described in detail herein.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An aircraft system for an own-ship aircraft, comprising:
   an Automatic Dependent Surveillance-Broadcast (ADS-B) unit configured to receive ADS-B messages with flight information from other aircraft over a plurality of time periods, the other aircraft including a first aircraft;
   a database coupled to the ADS-B unit and configured to store at least a portion of the flight information associated with the other aircraft over the plurality of time periods;

a processing unit coupled to the ADS-B unit and the database and configured to compare the flight information for a current time period to the flight information for a previous time period to identify missing flight information from the current time period relative to the previous time period, the missing flight information including the flight information associated with the first aircraft, wherein the flight information in the ADS-B messages include, for each of the other aircraft, an aircraft identification, a position, an altitude, and a time stamp to identify the respective time period, and initiate an annunciation to an operator of the own-ship aircraft based on the missing flight information associated with the first aircraft, wherein the processing unit is configured to identify the missing flight information associated with the first aircraft when a time elapsed between the time stamp associated with the most recently received ADS-B message from the first aircraft and the current time period exceeds a predetermined threshold; and a display device coupled to the processing unit and configured to display the annunciation, wherein the processing unit is configured to evaluate the flight information for the current time period to identify proximate aircraft from the other aircraft and to display a traffic display on the display device with the annunciation that includes at least first icons representing the proximate aircraft, wherein the annunciation includes a text annunciation associated with the first aircraft, and wherein the text annunciation associated with the first aircraft includes the aircraft identification, the position, and the altitude from the most recently received ADS-B message from the first aircraft, the text annunciation further including the time elapsed between the time stamp associated with the most recently received ADS-B message from the first aircraft and the current time period.

2. The aircraft system of claim 1, wherein the processing unit is configured to determine an estimated current position of the first aircraft based on the position of the first aircraft from the most recently received ADS-B message from the first aircraft, compare the estimated current position of the first aircraft to an intended flight path of the own-ship aircraft, and display, when the estimated current position of the first aircraft is proximate to the intended flight path of the own-ship aircraft, a second icon representing the estimated current position of the first aircraft on the traffic display.

3. The aircraft system of claim 2, wherein the processing unit is further configured to determine a level of an uncertainty associated with the estimated current position of the first aircraft and to display an outline of a zone area surrounding the second icon on the traffic display that is sized based on the level of uncertainty.

4. The aircraft system of claim 2, further comprising sensors coupled to the processing unit and configured to collect data about the first aircraft in a flight environment, and wherein the processing unit is configured to estimate the position of the first aircraft based on the data from the sensors.

5. An aircraft system for an own-ship aircraft, comprising:
an Automatic Dependent Surveillance-Broadcast (ADS-B) unit configured to receive ADS-B messages with flight information from other aircraft over a plurality of time periods, the other aircraft including a first aircraft;

a database coupled to the ADS-B unit and configured to store at least a portion of the flight information associated with the other aircraft over the plurality of time periods;

a processing unit coupled to the ADS-B unit and the database and configured to compare the flight information for a current time period to the flight information for a previous time period to identify missing flight information from the current time period relative to the previous time period, the missing flight information including the flight information associated with the first aircraft, wherein the flight information in the ADS-B messages include, for each of the other aircraft, an aircraft identification, a position, an altitude, and a time stamp to identify the respective time period, and initiate an annunciation to an operator of the own-ship aircraft based on the missing flight information associated with the first aircraft, wherein the processing unit is configured to identify the missing flight information associated with the first aircraft when a time elapsed between the time stamp associated with the most recently received ADS-B message from the first aircraft and the current time period exceeds a predetermined threshold; and a display device coupled to the processing unit and configured to display the annunciation, wherein the processing unit is configured to evaluate the flight information for the current time period to identify proximate aircraft from the other aircraft and to display a traffic display on the display device that includes at least first icons representing the proximate aircraft, wherein the processing unit is configured to determine an estimated current position of the first aircraft based on the position of the first aircraft from the most recently received ADS-B message from the first aircraft, compare the estimated current position of the first aircraft to an intended flight path of the own-ship aircraft, and display, when the estimated current position of the first aircraft is proximate to the intended flight path of the own-ship aircraft, a second icon representing the estimated current position of the first aircraft on the traffic display.

6. The aircraft system of claim 5, wherein the processing unit is further configured to determine a level of an uncertainty associated with the estimated current position of the first aircraft and to display an outline of a zone area surrounding the second icon on the traffic display that is sized based on the level of uncertainty.

7. The aircraft system of claim 6, wherein the processing unit is configured to generate a message requesting updated information for the first aircraft, and wherein the aircraft system further comprises a communication unit coupled to the processing unit and configured to send the message to air traffic control.

8. The aircraft system of claim 7, wherein the communication unit is configured to receive the updated information from air traffic control, wherein the processing unit is configured to update a position of the second icon on the traffic display based on the updated information, and wherein the processing unit is further configured to update or remove the outline of the zone area surrounding the second icon on the traffic display.

9. The aircraft system of claim 5, further comprising sensors coupled to the processing unit and configured to collect data about the first aircraft in a flight environment, and
wherein the processing unit is configured to estimate the position of the first aircraft based on the data from the sensors.

10. The aircraft system of claim 5, wherein the processing unit is configured to display the annunciation with the traffic display.

11. The aircraft system of claim 10, wherein the annunciation includes a text annunciation associated with the first aircraft.

12. The aircraft system of claim 11, wherein the text annunciation associated with the first aircraft includes the aircraft identification, the position, and the altitude from the most recently received ADS-B message from the first aircraft, the text annunciation further including the time elapsed between the time stamp associated with the most recently received ADS-B message from the first aircraft and the current time period.

13. A method for monitoring aircraft traffic on an own-ship aircraft, comprising the steps of:
receiving first messages with flight information from other aircraft during a first time period;
evaluating the flight information to identify proximate aircraft from the other aircraft relative to the own-ship aircraft;
displaying symbology representing at least the proximate aircraft on a traffic display of a display device;
storing the flight information for each of the proximate aircraft;
receiving second messages with flight information from at least a portion of the other aircraft during a second time period;
comparing the flight information from the second messages with the flight information from the first messages to identify missing flight information in the second time period, the missing flight information being associated with at least a first aircraft of the other aircraft; and
generating an annunciation based on the missing flight information for the first aircraft,
wherein the generating step includes generating a warning when a time elapsed between the second time period and the first time period is greater than a predetermined threshold, and
wherein the generating step includes generating the annunciation as a text annunciation that includes a first aircraft identification, a first aircraft position, and a first aircraft altitude from the first messages and the time elapsed.

14. The method of claim 13, further comprising
estimating a current position of the first aircraft,
comparing a flight path of the own-ship aircraft to the estimated current position of first aircraft, and
displaying symbology on the traffic display representing the estimated current position of the first aircraft when the estimated current position of the first aircraft conflicts with the flight path of the own-ship aircraft.

15. The method of claim 14, further comprising
determining a level of uncertainty associated with the estimated current position of the first aircraft, and
wherein the displaying step includes displaying the symbology with an outline of a zone area on the traffic display that is sized based on the level of uncertainty.

16. The method of claim 15, further comprising
generating a message requesting updated information for the first aircraft;
sending the message to air traffic control;
receiving the updated information from the air traffic control; and
updating the symbology based on the updated information, including updating or removing the outline of the zone area.

17. The method of claim 14, further comprising
collecting updated information about the first aircraft with a sensor; and
updating the symbology based on the updated information about the first aircraft.

* * * * *